Aug. 22, 1961   V. R. MUMMA   2,997,597
APPARATUS FOR MEASURING PARTICLE SIZES IN AN AEROSOL
Filed Aug. 11, 1959
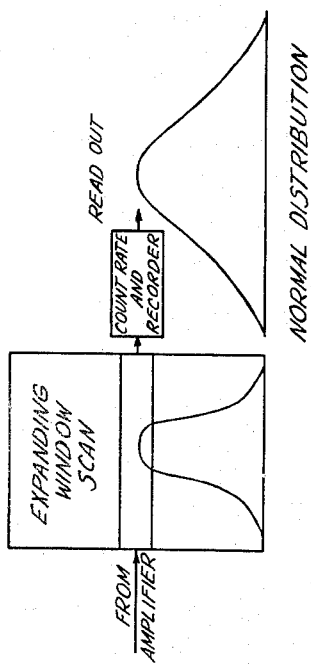
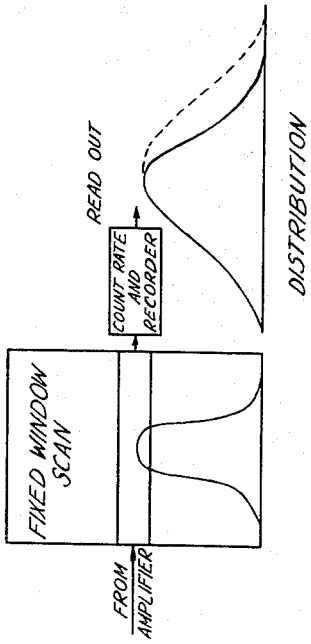
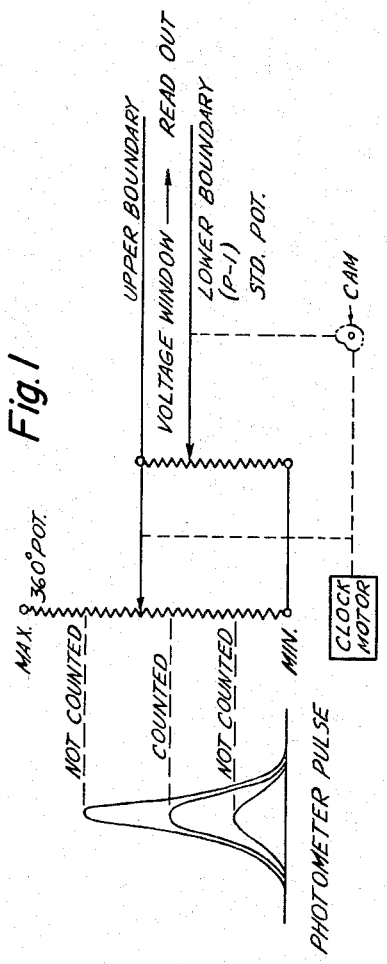
INVENTOR
Victor R. Mumma
BY
ATTORNEY

2,997,597
APPARATUS FOR MEASURING PARTICLE SIZES IN AN AEROSOL

Victor R. Mumma, Boonsboro, Md., assignor to the United States of America as represented by the Secretary of the Army
Filed Aug. 11, 1959, Ser. No. 833,116
4 Claims. (Cl. 250—218)
(Granted under Title 35, U.S. Code (1952), sec. 266)

The invention described herein may be manufactured and used by or for the Government of the United States of America for governmental purposes without the payment to me of any royalty thereon.

This invention relates to a system for measuring the relative sizes of particulate matter in the air. More specifically, it relates to a method and apparatus for determining the proportion of the total particles present that fall in the various size ranges.

Systems for counting particulate matter in the air by means of light pulses scattered from the particles is well known. In such systems the air is passed in a uniform stream at uniform velocity through a highly illuminated viewing zone. As the particles pass the illuminated area, pulses of scattered light from the particles passes into a photo tube which convert the light pulses into voltage pulses. The light pulses and the resulting voltage pulses are proportional to the size of the particles and consequently can be used as a measure of particle sizes. The particle sizes and the voltage pulses are not in linear relationship, however, hence the voltage pulses have to be "interpreted" in order that they may indicate true size distribution of the particles.

The purpose of the present invention is to provide the means whereby the voltage pulses do in fact represent a linear relationship with particle sizes. This is accomplished by varying the width of a voltage window of a pulse height discriminator as it scans from minimum to maximum to measure and count the photometer pulse heights. This variation in window widths is then tailored to fit a non-linear amplitude response curve.

Some types of height analyzers employ a voltage window of fixed width which slowly scans the voltage scale from minimum to maximum particle sizes. In such instruments, any pulse that arrives with sufficient voltage height to pass the lower boundary, but not to exceed the upper boundary of the voltage window are counted. The counts, which are integrated into count rate and read directly or recorded, indicate the number of particles present in that particular size grouping. While the pulse height is a function of particle diameter, the relationship is not a linear function and varies according to the Mie theory which indicates a complicated pattern for particles of 0.1 to 1.0 micron diameter and is a function of size as well as angle of view. Beyond 1.0 micron diameter, the voltage output varies essentially as the square of the diameter, hence, if the window is of fixed width with respect to voltage, the width with respect to size becomes increasingly narrow as the voltage and pulse size increases. The present invention proposes to overcome this limitation by expanding the window as it scans from minimum to maximum voltage in such a manner that it closely fits the non-linear response curve. Thus the window width with respect to particle size will remain constant.

An embodiment of this principle is illustrated in the schematic in FIG. 1 where the parts are labeled and show first a 360° rotary scanning potentiometer, to the movable arm of which is attached a second potentiometer which has a fixed setting. The latter setting, while fixed in itself will nevertheless represent a fraction or percentage of the larger voltage setting in all cases and since this latter setting is continually varying, the voltage window or two boundaries created by the second potentiometer will likewise vary; that is, it will have a variable span as the scanning potentiometer traverses its voltage field.

A setting of 20% of the secondary potentiometer will closely approximate the square law and is therefore effective on particle sizes of 1.0 micron or larger, where the output voltage varies as the square of the diameter.

On particles below about 1.0 micron, the square law is no longer applicable and other methods subsequently to be discussed must be used.

The rotary scanning potentiometer is driven by a clockwork motor and makes a complete cycle or uniform voltage scan usually in a period of minutes. The distribution curve resulting from this variable window type of scanning is shown in FIG. 2.

In the operation of this invention, the potentiometer combination is attached to the phototube output of an ordinary particle scanner such as represented in U.S. Patent No. 2,732,753 to O'Konski. The output of this phototube is a series of discrete voltage pulses representing the passage of different size particles through the viewing zone. It is desired to count these pulses by size to thereby determine the relative distribution of different size particles in the aerosol. To accomplish this, the voltage pulses are fed into a read out instrument that responds to voltage pulses by counting them. By interposing the present potentiometer window and slowly scanning the voltage scale the read out instrument will count only those particles whose voltage pulses fall within the beforementioned window span. With sufficient uniform aerosol available for a complete count, the aerosol sampling machine is started and the scanning potentiometer motor is set at zero. Thus there is counted first the smallest particles with progressively larger particles being counted as the scanning potentiometer moves up on the voltage scale. By the time the maximum voltage position on the potentiometer is reached, only the largest particles are being counted and if the time is sufficiently long (several minutes) a very accurate measure of particle distribution will be had.

A diagrammatic view of this expanding window type of scanning and its distribution curve is shown in FIG. 2.

Where a non-linear response other than a percentage response is desired, such as is necessary in counting particle sizes below 1.0 micron in size, it can be accomplished by means of the additional mechanism shown in FIG. 1. In this instance there is used an additional cam element on the timing motor shaft, which cam alters the width of the voltage window while the scanning potentiometer is being actuated. By properly shaping this cam, it is possible to tailor the window to comply with any non-linear response curve.

In analyzing particle distribution in an aerosol, other methods have been utilized heretofore. Perhaps the simplest method is a series of fixed channel discriminators or windows as shown in FIG. 3. Here instead of a continuous scanning with a variable window, a series of fixed windows are provided and the recorder is connected to the various windows in turn. In other words, instead of scanning the voltage field, the series of fixed windows are scanned by being connected to the recording unit in turn. The problem here is the extensive equipment necessary and the absence of an infinite number of size determinations. The difference between a fixed window and expanding window scanning is observed in FIG. 3 where a comparison of the size distribution of particles by the two methods is compared. It will be seen that the distribution curve favors the expanding window type of scan which is the subject matter of the present invention and is shown in FIG. 3 as a dotted line superposed over the curve made by the fixed window type of distribution curve.

By means of this invention it is possible to make a running determination of particle distribution in a volume of aerosol by testing for the smallest particles first and progressively for larger and larger particles as the voltage window scans the entire voltage spectrum.

I claim:

1. In an apparatus for determining size of aerosol particles, which apparatus includes means for passing an air stream containing such aerosol through a viewing zone illuminated by an incident light source, a photoelectric tube and optical system positioned to scan said illuminated zone, an amplifier having input and output terminals, and having its input terminal connected to said photoelectric tube, a pulse recorder connected to said amplifier, the improvement which includes first and second potentiometers in series between said amplifier and said pulse recorder, each of said potentiometers comprising a resistance element with input terminal at one end and a ground terminal at the other end, a sliding contact with said resistance element constituting an output terminal, said first potentiometer having its input terminal connected to the output terminal of said amplifier and having its output terminal connected to the input terminal of said second potentiometer, the input and output terminals of said second potentiometer being connected to the input terminals of said pulse recorder.

2. A structure in accordance with claim 1 wherein the first potentiometer has its movable element swept from minimum to maximum periodically by means of a clockwork motor.

3. A structure in accordance with claim 2 wherein said potentiometer is a rotary element so that it successively sweeps from minimum to maximum in continuous movement.

4. A structure in accordance with claim 2 wherein said clockwork motor includes a cam element which alters the second potentiometer setting periodically as the first potentiometer sweeps from minimum to maximum, said cam so altering the voltage setting that the output voltage boundaries have a straight line relationship with aerosol particle sizes below 1.0 micron in size.

References Cited in the file of this patent

UNITED STATES PATENTS

| 2,087,039 | McMaster | July 13, 1937 |
| 2,732,753 | O'Konski | Jan. 31, 1956 |
| 2,791,695 | Bareford et al. | May 7, 1957 |
| 2,850,239 | Polanyi et al. | Sept. 2, 1958 |
| 2,891,722 | Nuttall et al. | June 23, 1959 |
| 2,920,525 | Appel et al. | Jan. 12, 1960 |